United States Patent [19]

Brown

[11] 4,000,718
[45] Jan. 4, 1977

[54] PNEUMATIC AUTOMATED MILKING PARLOR

[76] Inventor: Michael J. Brown, 9955 9¼ Ave., Hanford, Calif. 93230

[22] Filed: Apr. 14, 1975

[21] Appl. No.: 567,727

[52] U.S. Cl. .......................................... 119/14.03
[51] Int. Cl.² .......................................... A01J 7/00
[58] Field of Search ......... 119/14.03, 14.08, 14.04, 119/27

[56] References Cited
UNITED STATES PATENTS

| | | | |
|---|---|---|---|
| 3,223,070 | 12/1965 | Gribble et al. | 119/14.03 X |
| 3,246,631 | 4/1966 | Holm | 119/14.03 |
| 3,603,292 | 9/1971 | Finch | 119/14.03 |

Primary Examiner—Hugh R. Chamblee
Attorney, Agent, or Firm—Vergil L. Gerard

[57] ABSTRACT

Disclosed is an automated milking parlor in which cows are directed from an entry area through prep stalls where they are prepared for milking and on to milking stalls where they are machine milked, by automated stall gates, feeders and washing devices substantially all of which are pneumatically operated and controlled. The milking parlor has two banks, each with one prep stall and three milking stalls, all operated by a single milker from a pit between the banks. A pneumatic logic circuit sequences and actuates the operation of all stall gates, and prevents cows from being released from the prep stall until they are fully prepared for milking and a milking stall is available. Milk received by the milking machines is piped directly to storage facilities at the exit end of the parlor, and milking machines which automatically release when the milk from the cows stops are used to actuate appropriate portions of the operation sequencing.

21 Claims, 7 Drawing Figures

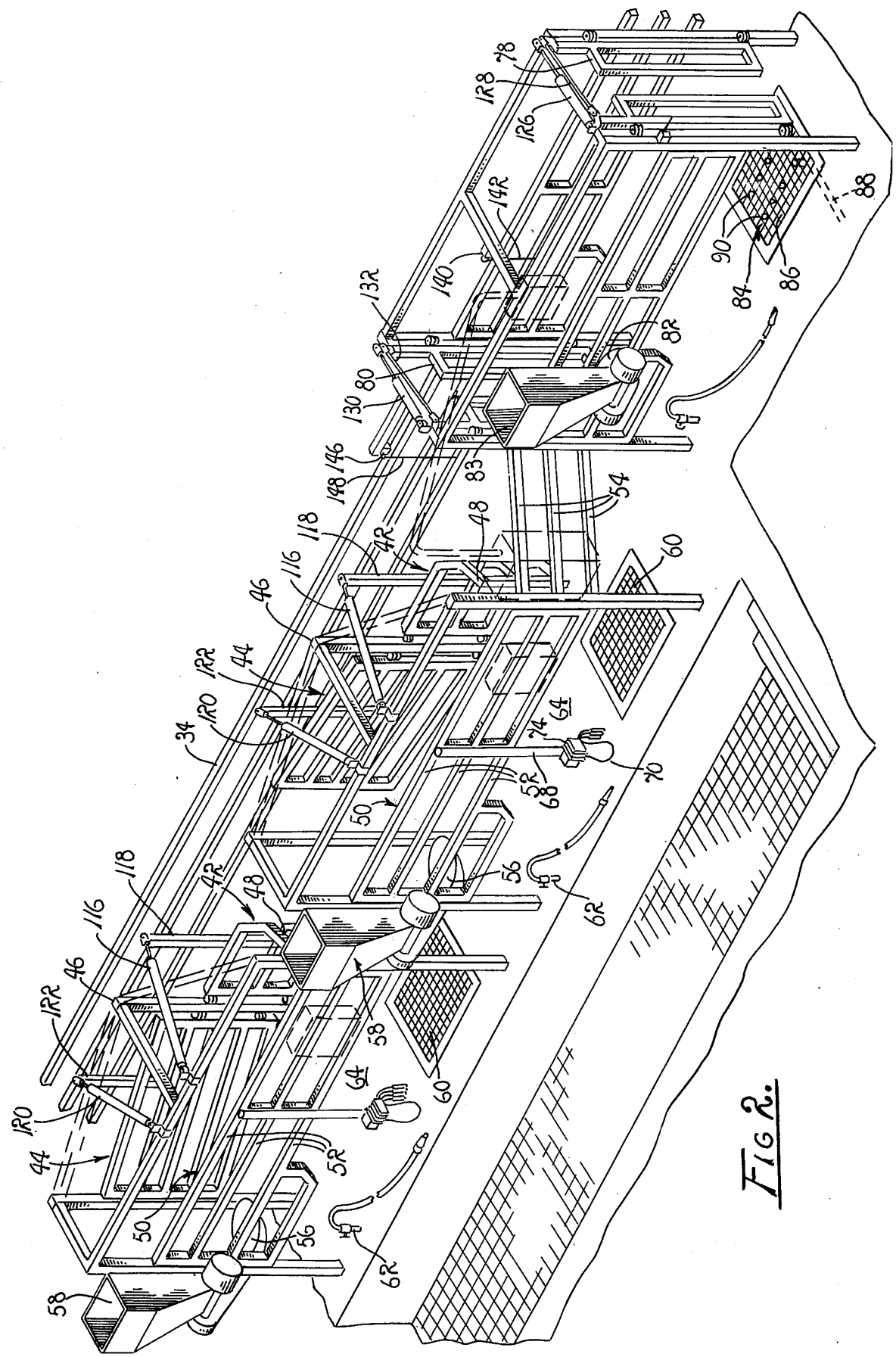

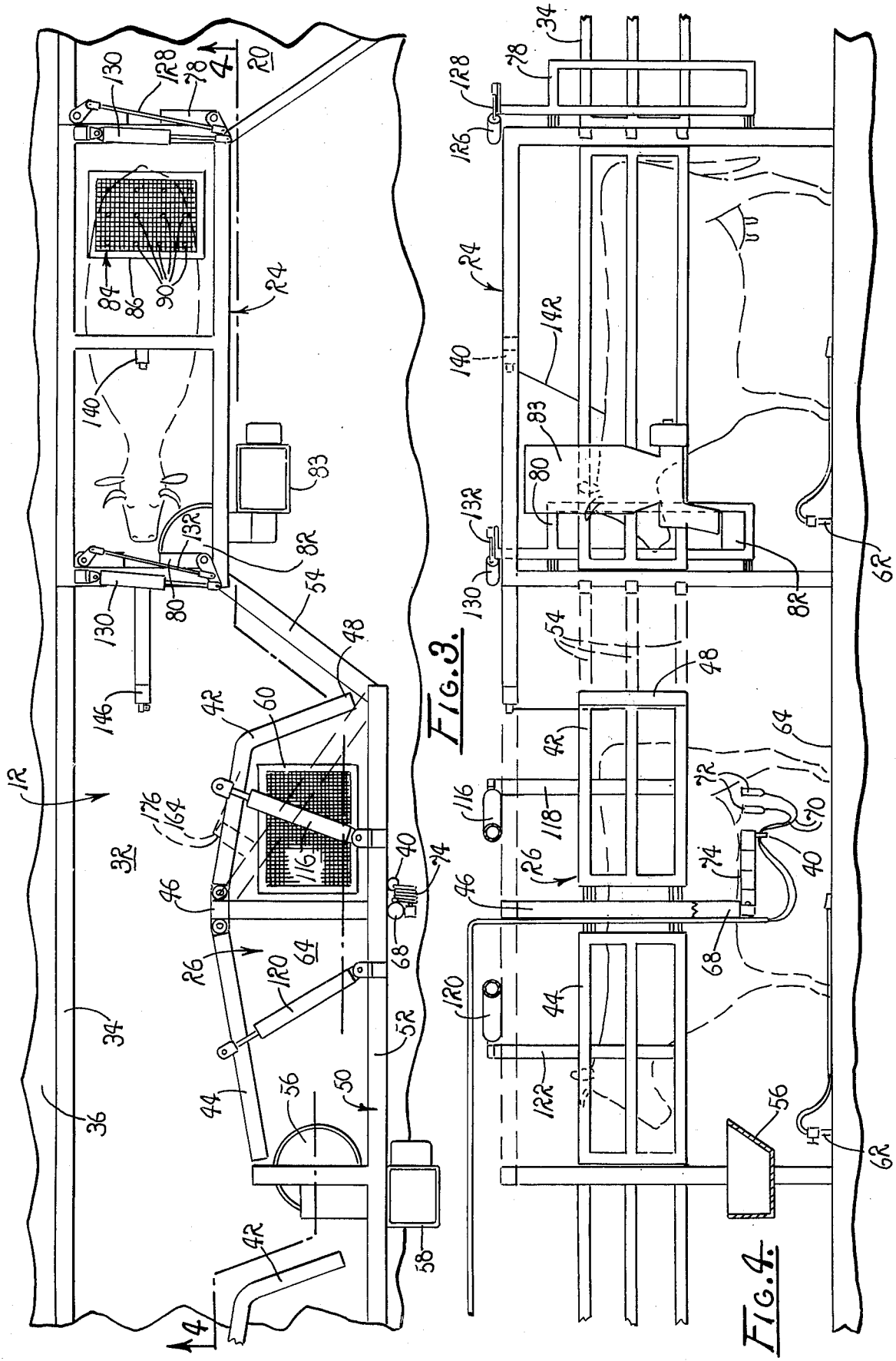

PNEUMATIC AUTOMATED MILKING PARLOR

BACKGROUND OF INVENTION

This invention relates generally to milking barns and more particularly to automated milking parlors in which cows are directed through the milking process by the use and control of mechanized devices. Over the years mechanization of milking barns has continuously increased due to the increase of labor costs and standards of sanitation. By the use of mechanically operated gates on stalls, electrical control devices, and a variety of floor plan arrangements, automated milking parlors have been devised which greatly reduce the amount of manual labor required to milk a herd of cows. However, the floor plans, gating arrangements, and stall facilities previously devised have no automated milking procedures to the fullest extent possible, and further improvements for the reduction of labor costs and the increase in sanitary conditions is desirable.

Moreover, automated milking parlors previously devised have relied primarily on electrical circuitry and electronic logic and control devices for actuating and sequencing their operations. Since water spray and wet surfaces are common and indispensable in a milking parlor, the extensive use of electrical and electronic equipment is undesirable because of the hazards of electric shock to personnel and cows, and of the cost of protecting against this hazard to the fullest extent possible. It is, therefore, also desirable to provide a milking parlor automated primarily by power and control devices and circuits which are not electrical.

It is, therefore, a major object of this invention to provide an automated milking barn which further reduces labor costs, substantially increases operating safety to personnel and animals, and maintains excellent sanitary conditions.

It is another important object of this invention to provide an automated milking parlor in which the operating mechanisms and the actuating and sequencing devices are substantially all pneumatically operated.

It is another object of this invention to provide an automated milking parlor of the type described which is so arranged and controlled that a single operator can handle up to eight milking stalls and can milk approximately 60 cows per hours.

It is a further object of this invention to provide an automated milking parlor of the type described in which the preparation of a cow for milking includes feeding of a controlled mix and quantity of feed and warm water udder spraying for a controlled period of time.

It is still another object of this invention to provide an automatic milking parlor of the type described in which each milking stall is equipped to automatically provide a predetermined ration of feed on either a free flow or fixed charge basis, the stall floor washing is conveniently accommplished, and an automatically releasing type milking machine can be adapted to actuate the stall gates for exit of the milked cow and entry of one which has not been milked.

It is still a further object of this invention to provide an automated milking parlor of the type described in which flow control of the cows is partially achieved by cow contact devices which positively ascertain cow positions, and has manual overrides for direct operation control.

These and other objects and advantages of my invention will become more readily apparent from the following detailed description of a preferred embodiment when read together with the accompanying drawings in which:

FIG. 2 is a partial perspective view showing a prep stall, two milking stalls, and the operator's pit;

FIG. 3 is a partial plan view of a prep stall, one milking stall, and part of another milking stall;

FIG. 4 is a partial side elevational view of the prep stall and milking stalls shown in FIG. 3;

Figure 1:
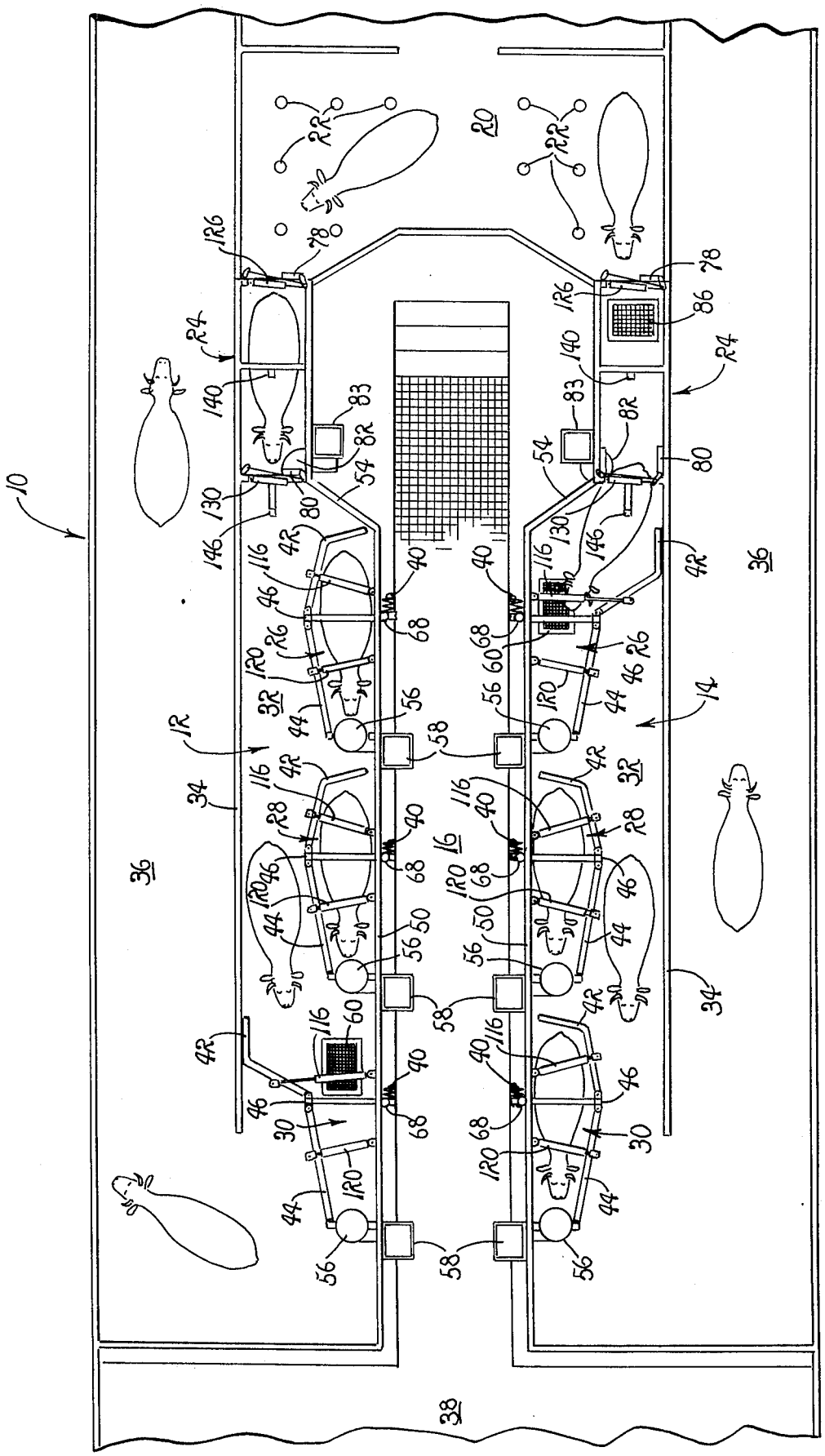
FIG. 1 is a plan view of a preferred embodiment of this invention showing the flow of cow traffic through the parlor.

Referring now to the drawings, and particularly FIGS. 1 through 4 thereof, the numeral 10 designates generally my automated milking parlor. The milking parlor 10 has two banks 12 and 15 of three milking stalls each, separated by a pit 16. The floor of the pit 16 is three to four feet below the floor of the stall banks 12 and 14, so that the milking operator does not have to stoop to attach and detach automatic milking machines to the cows.

An entry area 20 is provided at the entrance to the stall banks 12 and 14. In the entry area 20, a hoof and leg washing apparatus 22 of the type well known in the art is provided. At the entrance to each of the stall banks 12 and 14, a prep stall 24 is provided, followed by three milking stalls, first stall 26, second stall 28, and third stall 30, positioned in front to rear alignment along the edge of the pit 16.

Along the outside of the milking stalls, a cow flow passage 32 is provided between the milk stalls and a separator wall 34. The passage 32 is aligned with the prep stall and permits cows to travel from the prep stall to a selected one of the milking stalls. At the exit end of each stall bank, a return path 36 is provided outside of the separator wall 34 for return of the cows to the pasture after milking. At the exit end of the parlor just beyond the stall banks I provide a storage area 38 where milk from the milking machines is delivered for storage under refrigerated conditions. Automatic milking machines 40 are mounted in the pit 16 adjacent each of the milking stalls and are connected to the storage area 38 by pipes.

As best shown in FIGS. 2, 3 and 4, the milking stalls 26, 28 and 30 (third stall 30 is not shown to avoid duplication) each have an entry gate 42 and an exit gate 44. Each of these gates are hinge mounted on the outside wall 46 of the milking stall and swing into the cow flow passage 32 when they are opened. The entry gate 42 is generally hook shaped at its distal end 48. When the gate is open the distal end 48 fits flush against the face of separator wall 34 on the outside of the cow flow passage 32, and when closed, it wraps around the rear portion of a positioned cow in the stall in a manner which urges the cow inward and forward. Thus positioned, the cow is readily accessible to an operator in the pit.

The inside wall 50 of each of the milking stalls is stationary and has rails 52 which are so arranged that access to a cow's udder from the pit 16 can be achieved without interference. Access to the pit from the area between the first milking stall 26 and the prep stall 124 is prevented by rails 54.

At the forward, or exit, end of each milking stall, a feed trough 56 is provided and supplied by a feed dispenser 58. At the rearward portion of the milking stalls, a wash water drain opening 60 is provided in the floor and covered by a grate. The wash water drain opening 60 connects to a wash water drain pipe (not shown) which carries wash water and waste from the floor of the stalls out of the parlor. A wash water supply pipe 62 is provided in the forward portion of each milking stall to supply a spray wash and the stall floors 64 are contoured to drain the wash water into the wash water drain opening 60. The exit gate 44 of each of the milking stalls is a straight gate which also swings open against the face of the separator wall 32 and across the cow flow passage 34. The exit gate 44 removes the forward half of the milking stall on the outer side when it opens. Because of its length and straight configuration it can pass just behind the rear portion of a cow, or even drag across the cow's rear quarters on closing, and therefore can readily separate a lead cow from a follower even though the nose of the follower is nearly in contact with the rear of the leader. This facility to prevent a cow moving into a milking stall from following a cow that is exiting from the stall is important to the effective handling of cows in the parlor as will be more readily apparent from the later description of its operation.

The automatic milking machines 40 are installed on a stanchion 68 adjacent the inside wall of each milking stall. The hoses 70 and connectors 72 of each milking machine are supported on a pivotal arm 74 so that they can be readily swung in under the cow's udder and back out again (see FIG. 4). Where desirable, the retraction of the hoses 70 and connectors 72 from underneath the cow can be done with automatic retraction equipment furnished on the milking machines and well known in the art. As will be later explained, this automatic retracting equipment can be connected into the control circuitry of the milking parlor and arranged to initiate certain sequences as the connectors and hoses are withdrawn from the cow. The milking machines 40 also have a height adjustment mechanism for the support arm 74 that carries the hoses and connectors. This adjustment mechanism, well known in the art, is normally activated by knee contact of the operator and raises or lowers the support arm to adjust it to the size of cow held in the stall for milking.

The prep stalls 24 at the entry to each bank are best shown in FIGS. 2, 3 and 4. The prep stalls 24 each have an entry gate 78 and an exit gate 80. Both the entry gate 78 and the exit gate 80 are split gates with half of the gate being hinged to each side of the stall. The prep stalls 24 each have a feed trough 82 in the forward end and an automatic feed dispenser 83 which supplies the trough. At the rear of each stall an udder washing device 84 is provided with a surrounding drain pit 86 which connects with the drain pipe previously mentioned. The udder washing device 84 has pipes 88 with nozzles 90 which are located in the drain pit. The nozzles 90 direct warm water onto the udder of a cow in the prep stall for a predetermined period of time to wash the udder and help free the milk flow. The exit gate 78 of each prep stall opens inwardly to a flush position along the insides of the stall and the entry gate 80 opens outwardly in front of the stall. Thus, although the gates for both entry and exit from the stall pivot open in a direction of movement opposite to that of the cow, they avoid interference with the cow because they are of half gate structure.

OPERATION

Having described the arrangement of my two bank, six stall, milking parlor, I will now describe the manner of its operation. For this description it shall be assumed that the milking stalls 26, 28 and 30 and the prep stalls 24 are occupied by cows positioned as shown in FIG. 1 and that a reservoir of unmilked cows is gathered in the entry area 20 where they have had their legs and hooves washed down by the sprayers 22. As shown in FIG. 1, cow A, formerly in the forwardmost milking stall 30 of the right hand stall bank 12, has completed its milk delivery, has been released from the stall, and has proceeded on down the cow flow passage 32 and into the return passage 36. Since automatic retracting equipment is used on the milking machine 40 in this embodiment, the release of this cow occurs as follows: the milking machine controls sense the stopping of milk flow and shut the machine down, releasing the connectors 72 from the teats of the cow, whereupon the retraction mechanism was actuated to swing the support arm 74 out from underneath the cow to the pit area. (Where automatic release machines are not used, the milker must observe the cessation of milk flow himself and then shut down the milking machine, remove the connectors 72, and swing the support arm 74 out of the milk stall.)

When support arm 74 retraction mechanism is retracted, it actuates a switch in the control circuit which opens the entry gate 42 of the milking stall. This causes the entry gate 42 to swing open with its distal end 48 against the face of the separator wall 34 and block the cow flow passage 32 to the passage of any cow beyond this point. (If the release of the milking machine is done manually, then the operator himself must initiate the opening of the entry gate 42.) In either case, the operator then inspects the cow's udder to be sure that it is healthy in all respects and ready to be released from the stall.

At the same time as the opening of the entry gate 42 of the milk stall 30 was initiated, the control circuit also activates the opening of the exit gate 80 of the prep stall 24, permitting the cow B, who was formerly in the prep stall, to move out of the prep stall and down the cow flow passage 32 to the milking stall 30. As cow B leaves the prep stall it engages an exit gate contact wand and closes a gate control switch which closes the exit gate. Upon closing, the exist gates engage a limit switch which opens the entry gates of the prep stall.

The cow B is directed into the milking stall 30 by the open entry gate 48. The entering cow could not get into the milking stall, of course, until cow A was released.

When inspection of the udder of the milked cow was completed, the operator opened the exit gate 44 of the milking stall, permitting the milked cow to leave the stall and proceed down cow flow passage 32 to the return passage 36 (to the position shown in FIG. 1). The exiting cow A is urged out of the stall by the entering cow B who seeks entry into the stall to reach the feed about to be dispensed into the trough by the automatic feed dispenser 58.

After exiting cow A has moved out of the milking stall 30, the exit gate 44 is closed, and when entering cow B is in the stall, the entry gate 42 is also closed. The closed position of entry gate 42 is adjustable to the size of the cow and can be controlled to urge the cow to the front and inside of the stall where access for milking is easiest. At the same time, the operator activates the feed dispenser 58 to dispense the feed into the trough 56 so the cow is rewarded for entering the stall and contented to remain there during milking.

After the cow is situated in the stall, the operator attaches the milking teat-cups 72 to the cow. The cow is then in the same condition as cows C and D in stalls 26 and 28 and will remain in the stall until the milking is completed. The operator then leaves the cow B and proceeds on to cows in other milking stalls.

In the meantime, a cow E from the entry area 20 has moved into the prep stall 24, since the closing of the exit gates of the prep stall also initiates the opening of the entry gate. An entry gate contact wand is provided in the prep stall 24 so that when the cow E contacts the wand upon entry into the prep stall, the entry gates 78 are closed and cow E is captured in the prep stall, as shown in FIG. 1.

When both the exit and entry gates of the prep stall are closed, the control circuit initiates feeding and udder washing. Feeding is accomplished by activating the automatic feed dispenser 83 which delivers into the feed trough 82.

The udder wash 84 is initiated and operated for a predetermined period of time to warm and wash the udder of the cow, by activation of a value in the pipes 88. The period of time required to prepare a cow in the prep stall is so related to the time a cow remains in a milking stall, that one prep stall can supply three milking stalls quite easily, and four milking stalls satisfactorily. Also, as will be explained in greater detail later, the prep stall is so sequenced with the operation of the milking stalls in its bank, that a cow is not released from the prep stall until there is a ready milking stall and the preparation in the prep stall is completed.

It will thus be understood that as each cow in the three milking stalls on the right bank completes its milking and is detached from the milking machine, it is inspected by the operator and then released from its stall and at the same time a replacement cow is released from the prep stall and comes down the cow flow passage 32 to enter the milking stall being vacated.

OPERATING APPARATUS

Having described the prep stalls and milking stalls, and the general layout of the milking parlor 10, I will now describe the apparatus which operates the stall gates, feed dispensers, and udder wash, to carry out the sequencing for the automation of the parlor.

Figure 5:
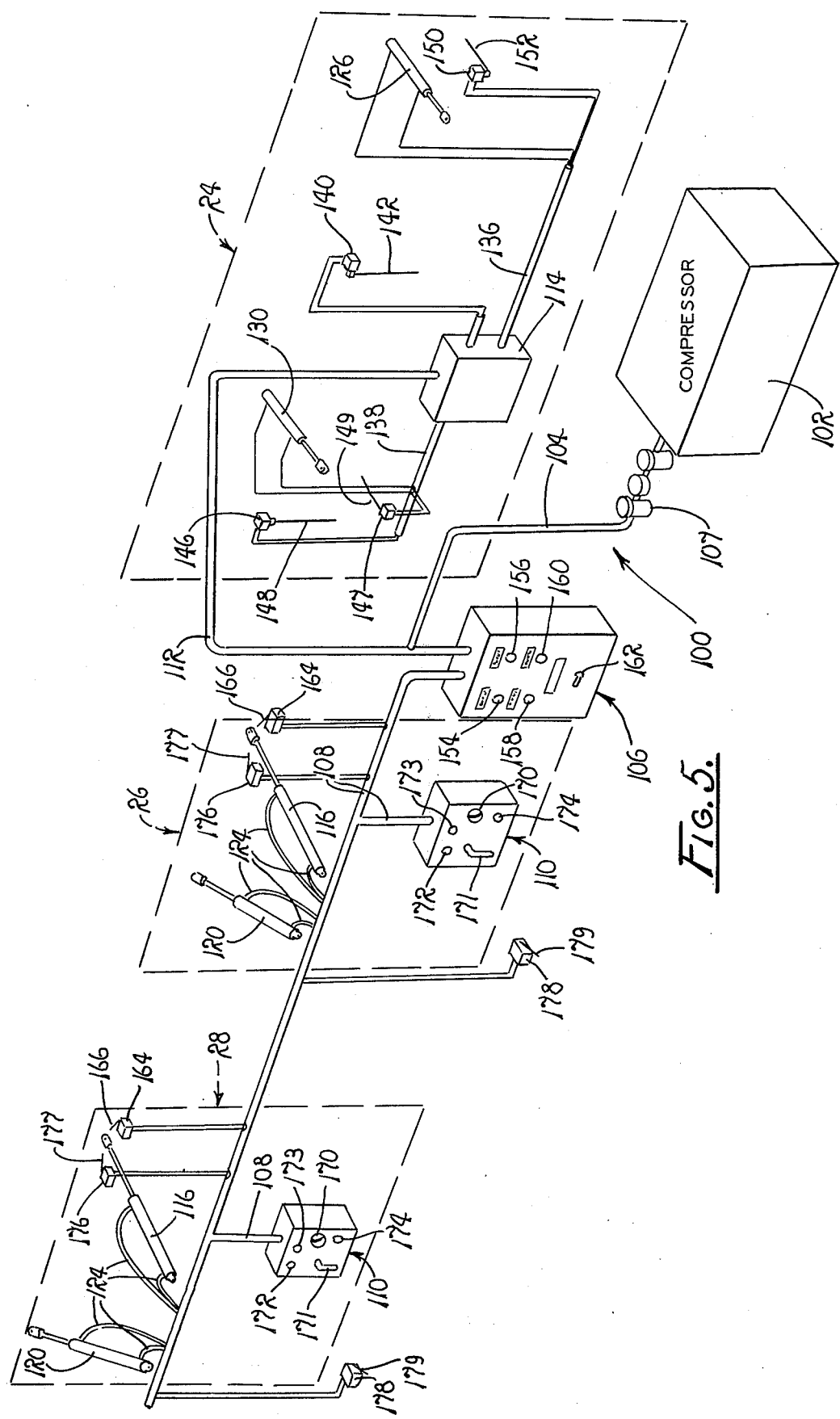
FIG. 5 is a perspective view of the pneumatic operating and control mechanisms for automation of the prep stall and milking stalls shown in FIGS. 2, 3 and 4.

Referring particularly to FIG. 5, the actuating system is entirely pneumatic except for electric motors in the automatic feed dispensers. This automated milking parlor thus eliminates substantially all of the risk and expense of locating electrical apparatus in an area where water spray and wet surfaces exist.

My actuating system 100 consists of an air compressor 102 and a main air conduit 104 which extend from the air compressor to a prep stall control panel 106 on each of the banks of my parlor. Air treatment equipment 107, of the type commonly used in air lines, is mounted in the main air conduit 104.

A milk stall conduit 108 extends along each of the milking stalls in the bank from the main control panel and connects with a milk stall control panel 110 at each stall. A prep stall air conduit 112 extends from the prep stall control panel 106 to a prep stall connector panel 114. Each of the milk stalls 26, 28 and 30 has an entry gate cylinder 116 which is attached to the entry gate 42 by an entry gate connector 118, and an exit gate cylinder 120 which is attached to the exit gate 44 by an exit gate connector 122. The entry gate cylinder 116 and exit gate cylinder 120 are connected to the milk stall conduit 108 by air hoses 124.

The prep stall has an entry gate cylinder 126 connected to the two halves of the entry gate 78 by entry gate linkage 128, and the exit gate has an exit gate cylinder 130 which is connected to the exit gate linkage 132.

The entry gate actuating cylinder 126 is connected to the prep stall connector panel 114 by connector conduit 136 and the front gate actuating cylinder, by connector conduit 138. The entry gate linkage 128 interconnects the two halves of entry gate 78 with the actuating arm of the entry gate cylinder 126 in such a manner that when the arm is extended, the entry gate halves are pivoted outwardly from the stall in substantial alignment with the stall walls to permit entry of a cow, and when the actuating arm is retracted the gate halves are pivoted back normal to the stall walls into a closed position to prevent entry of a cow. The exit gate linkage 132, likewise, interconnects the two halves of the exit gate 80 with the actuating arm of the exit gate cylinder 130 so that when the arm is extended the gate halves swing inward into the stall into alignment with the stall walls, and when retracted return to their closed position normal to the stall walls.

To sense the entry of a cow into the prep stall and initiate the sequencing of the prep stall operations, a pneumatic entry switch 140 with a contact entry wand is provided midway in the stall. The entry wand 142 is contacted by the cow as it moves into the prep stall and this actuates the entry switch 140. The entry switch 140 is connected to the prep stall connector panel 114 by a set of feeder lines 144.

To sense exiting of a cow from the prep stall, a pneumatic exit switch 146 with an exit wand 148 is provided forward of the exit gates 80. The exit wand 148 is contacted by the cow as it moves out of the prep stall and this actuates the exit switch 146. The exit switch 146 is connected to the prep stall connector panel 114 by conductor conduit 138. An exit gate limit switch 147 is mounted adjacent the exit gates and is actuated when the exit gates close and strike the switch actuating arm 149.

To actuate the warm water udder spray in the prep stall a pneumatic valve (not shown) is provided in the warm water line and connected to the prep stall connector panel 114. The feed dispenser in the prep stall is operated by an electric motor which is actuated by a pneumatic-electric switch also located in the prep stall connector panel.

To initiate the operation of the udder spray and the feed dispenser, a prep stall operations switch 150 is provided with a contact arm 152 which is engaged by the entry gate when it closes. The prep stall operations switch is connected to the prep stall connector panel 114 by the connector conduit 136.

The prep stall control panel 106 has four pneumatic push button switches, an exit gate open button 154, an exit gate close button 156, an entry gate open button 158, and an entry gate close button 160. It also has a feed dispenser timer on-off switch 162, and other circuit elements, nearly all pneumatic, which are interrelated to carry out the automated functions of the system. These elements and their functions will be more fully explained later.

In each of the milking stalls the entry gate actuating cylinder 116 is connected to the entry gate 42 in such a manner that when the actuating arm is extended the entry gate is pivotally swung outward to its open position with the distal end of the gate flush against the separator wall 34 of the cow flow passage 32, and when the actuating arm is retracted the entry gate 42 is pivotally swung across the rear portion of the stall to close it. The entry gate actuating cylinder 116 has a normal retract position limit switch 164 with an actuating arm 166 which stops the closing of the entry gate at a large cow position.

Further closing of the entry gate by degrees is then possible by further actuation of the entry gate close button 160, to fit the gate to a smaller cow and thus urge the cow forward and inward in the milking stall.

The exit gate actuating cylinder 120 in each of the milk stalls, connected to the gate through connector 122, so connects the actuating cylinder 120 to the exit gate of the milking stall, that when the actuating arm of the cylinder is extended, the exit gate is swung pivotally outward into engagement with the separator wall 34 and when the actuating arm is retracted, the front gate is swung pivotally inward into engagement with the front of the milking stall to block exit from the stall. The automatic feed dispenser in each milking stall is driven by an electric motor through a pneumatic-electric switch located in the milking stall control panel 110, and activated by a feed timer switch 170 on the face of the panel.

The milking stall control panels 110 each have an exit gate control handle 171 which switches from exit gate closed to exit gate open, an entry gate open button 172 and an entry gate close button 173 for manual operation of the entry gate feed dispensing timer switch 170, and a prep stall call button 174.

Each milk stall also has an entry gate position switch 176, which has an actuating arm 177 that is engaged when the entry gate is in any of its closed positions. The entry gate position switch 176 is a normally open switch, so that it is closed until actuated and then opens. Since this switch is open when the entry gate of each milk stall is closed, it provides no system signal until the entry gate opens. Then it provides a signal to the logic circuitry hereafter described which keeps other milk stall entry gates closed when one is open for loading, as will be later explained.

Also, for full automation, each milk stall has a support arm contact switch 178 which is activated by a contact arm 179 when a milking machine automatically retracts the teat connectors from a cow. This switch provides signals to the logic circuitry which opens the entry gate on the milk stall and "call the prep stall" by opening the exit gates so a fresh cow is started toward the milk stall.

The milking stall control panels 110 also each contain circuit elements for effecting the automation of the milking stall including a timer for the automatic feed dispenser motor, most of which are pneumatic. These elements and their functions will be described later in greater detail.

LOGIC CIRCUITRY

Figure 6:
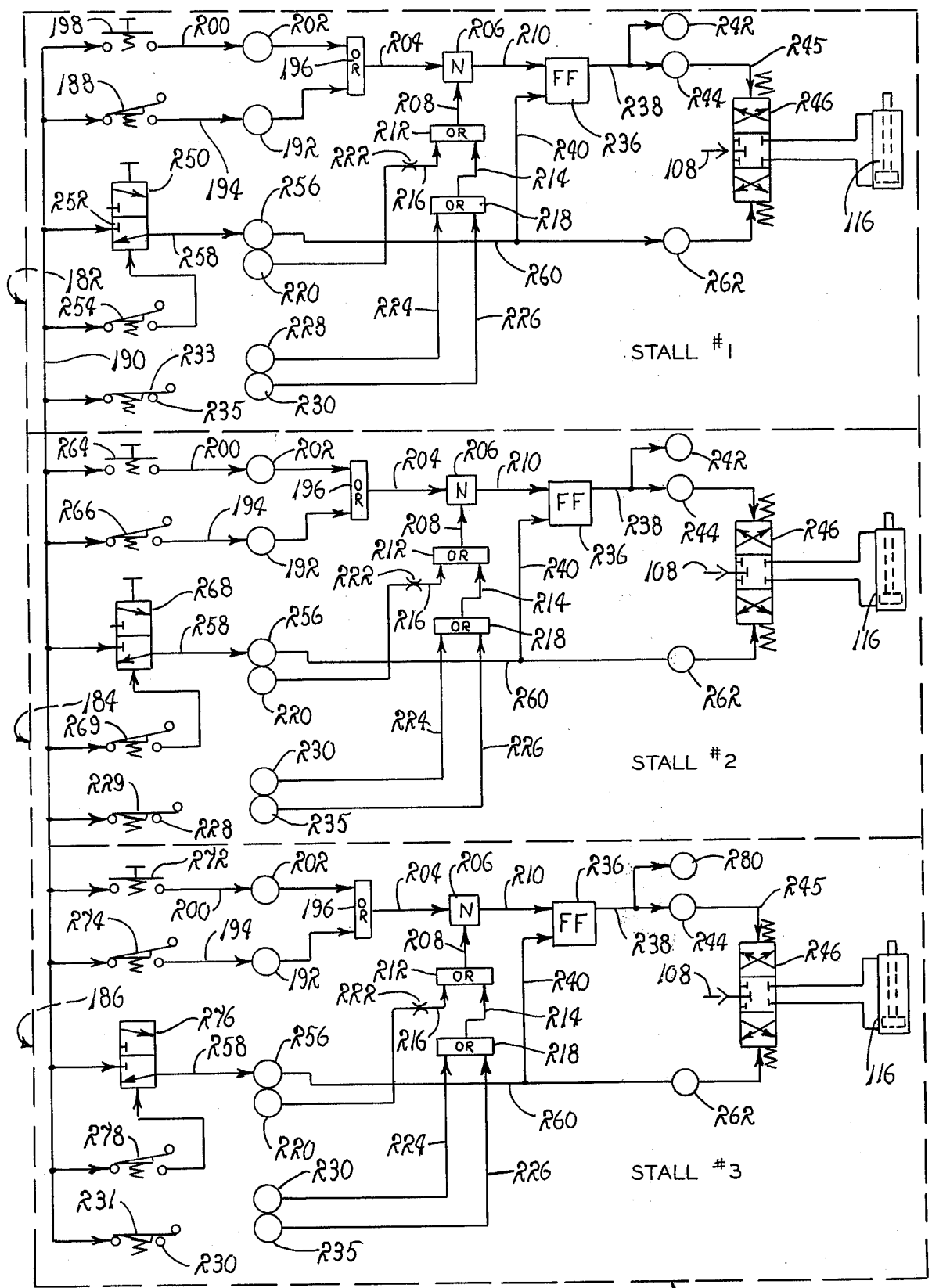
FIG. 6 is a schematic diagram of the pneumatic logic and control circuits for one complete bank of three milking stalls.
Figure 7:
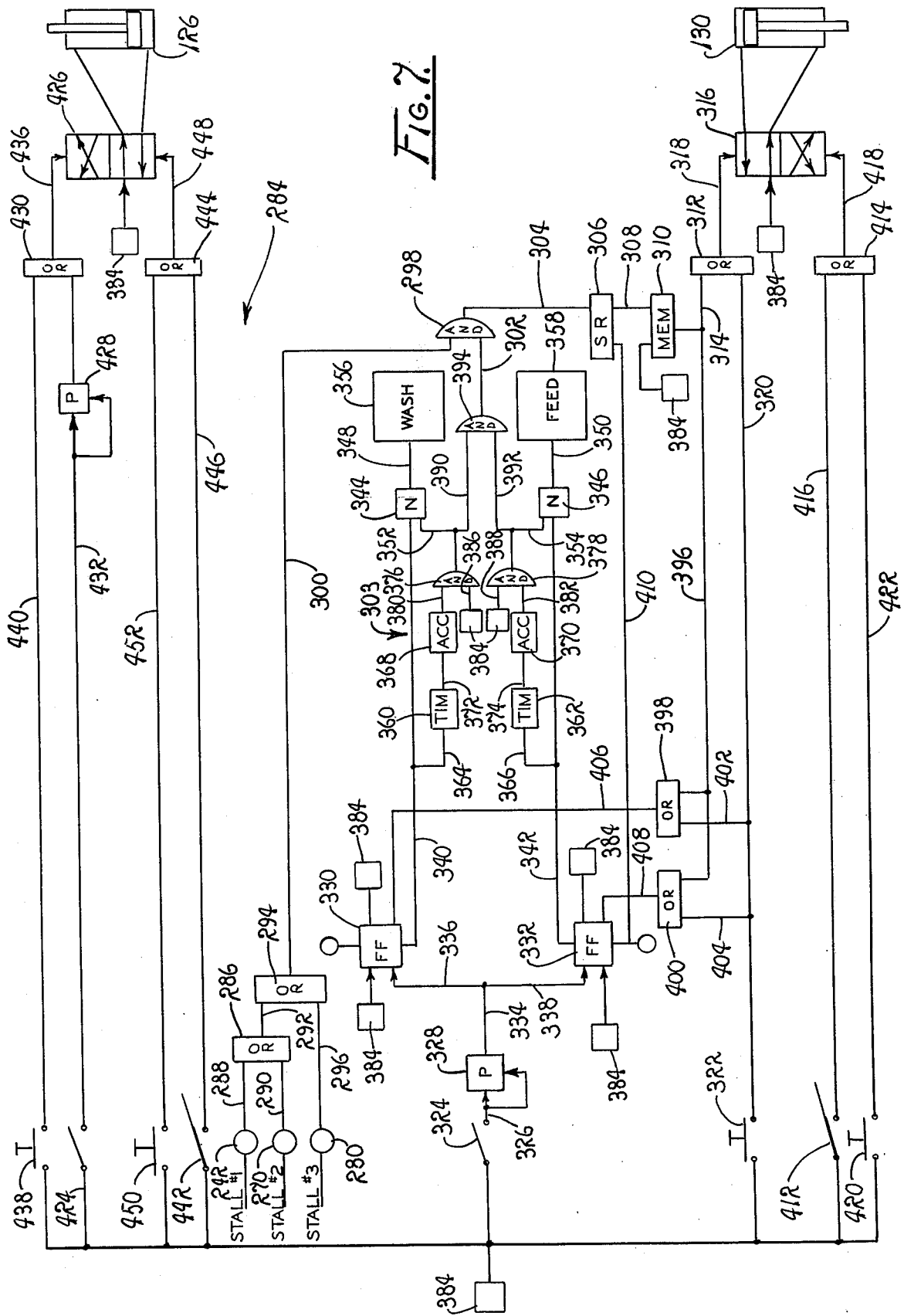
FIG. 7 is a schematic diagram of the pneumatic logic and control circuits for the prep stall that services a three milk stall bank.

To accomplish the automation of the milking parlor and utilize the control inputs to initiate the described functions, logic circuitry is utilized, as best shown in FIGS. 6 and 7. The elements of the logic circuitry are all pneumatic except for the pneumatic-electric switches, previously described, which control the electric motors in the feed dispensers.

For simplicity, the logic circuitry is shown schematically, and only the circuitry of one bank is included. This is sufficient to indicate the interrelationships and, as will be readily understood, the extension of this circuitry to the second bank, or even to additional milking stalls and double prep stalls in each bank, requires no more than duplication of the appropriate parts and systems.

The logic circuitry shown in FIG. 6 is arranged to operate the milking parlor in its fully automatic condition, utilizing milking machines which automatically shut down when the milk flow stops. As previously explained, these machines, well known in the art, automatically release the teat connectors from the cow and retract the connector support arm from beneath the cow. In its fully automatic condition, the sequencing of operations in the milking parlor is initiated by a switch which is actuated by the automatic retracting of the milking machine support arm. As will be explained, manual initiation of the sequencing is also possible.

Referring now to FIG. 6, the logic circuitry 180 for the milking stalls includes the first stall circuitry 182, second stall circuitry 184, and third stall circuitry 186. These circuits relate respectively to milk stalls 26, 28 and 30.

Assuming for ease of explanation that cow D in milking stall 26 is now finished delivering milk, and that cow E is in the prep stall 24, the logic circuitry will operate as follows: As the connector support arm 74 on the automatic milking machine 40 at milk stall 26 retracts it will actuate support arm contact switch 178 shown in the first stall circuitry as 188. The closing of switch 188 delivers air from the main control air bus 190 to control point 192 via conduit 194 to a pneumatic OR gate 196. The pneumatic OR gate 196, as is well known in the art, will pass on a signal received from either of two alternate input channels to a signal output channel. The alternate input to OR gate 196 is from a manually operable pneumatic switch 198, also connected to the main control bus 190 by conduit 200 and control point 202. The circuitry switch 198 is a circuit representation of the entry gate open button 172. Thus, an output signal will be dispatched from OR gate 196 when an input signal is delivered from either the support arm contact switch 178 (as when operation is fully automated) or from the manual switch 198 (as when the manual operation mode is utilized).

The output from OR gate 196 is delivered by conduit 204 to a pneumatic NOT gate 206. As is well known in the art, a pneumatic NOT gate will pass a signal to a single output channel so long as no signal is received simultaneously from an alternate input channel. The NOT gate 206 receiving a signal on one input channel via conduit 204 must not have a simultaneous signal from a second input channel via conduit 208 in order to pass an output signal to conduit 210. Conduit 208 is the output channel for an OR gate 212 which has two separate input channels, conduit 214 and conduit 216. Conduit 214 is the output channel of another OR gate 218 and conduit 216 is connected to control terminal 220 and is blocked off by line block 222. Control terminal 220 is not used in this control arrangement but is available for system expansion variation, as will be later explained.

The OR gate 128 for which conduit 214 is the output channel has two separate input channels, conduit 224 and conduit 226. Conduit 224 is connected to control point 228 which in turn connects to an entry gate position switch 229 in milk stall circuit 190 and conduit 226 is connected to control terminal 230 which is in turn connected to an entry gate position switch 231 in milk stall circuit 192. The entry gate position switches 229 and 231 are circuit representations of the entry gate position switches 176 in milk stalls 28 and 30. An input signal occurs at control points 228 and 230 when either of the entry gates of milk stalls 28 and 30 are open.

The entry gate positon switch 176 for milk stall 26 is represented in the stall circuitry 182 by 233 and is connected into stall circuits 184 and 186 via terminal 235. To achieve a signal on conduit 214, which is part of the automatic mode control, input signals must be derived from either of two input channels, conduit 224 or conduit 226. Since such a signal will occur when either milk stall 28 or milk stall 30 has an open gate, conduit 14 will pass a "do not respond" signal to the NOT gate 206 via conduit 208 and OR gate 212, when this occurs. Thus, no milk stall entry gate will automatically open if another milk stall entry gate is already open.

If no signal is received from conduit 208, the NOT gate 206 will deliver a signal to conduit 210 upon receipt of a signal from conduit 204, and deliver it to an FF gate 236. The FF gate 236 is a flip-flop and, as is well known in the art, delivers a signal to an output channel upon receipt of a signal from an input channel but will not repeat this function until it is reset by a signal from an alternate input channel. When a signal is received on input conduit 210, assuming the proper setting of the FF gate 236, it will deliver an out signal to conduit 238. Thereafter it will make no further response to input signals from conduit 210 until it is reset by a signal from conduit 240.

Conduit 238 is connected to two control terminals 242 and 244. Control terminal 244 is connected via conduit 245 to entry gate cylinder control valve 246, which controls the delivery of air to the actuating cylinder 116 which operates the entry gate of milk stall 26 via connector 118, as previously explained (see FIGS. 2, 3, 4 and 5). Entry gate cylinder control valve 246 directs incoming air from air main in stall conduit 108 to the extend portion of the actuating cylinder 116, and exhausts air from the retract portion, thus causing extension of the cylinder arm and opening of the entry gate 42. Control terminal 242 is connected to the prep stall circuitry and conveys a prep stall call signal to that circuitry. This signal is a duplicate of that provided by the actuation of the manually operable prep stall call button 174 on each of the milk stall control panels 110. This prep stall call signal actuates the exit gate in the prep stall 24 and releases cow E. There is an interlocking logic circuit, however, that prevents the prep stall exit gate from opening until the preparation of cow E is completed. That is, until the udder wash has operated for the desired period of time, and the cow has received and had time to consume the prep stall feed ration. This will be explained later in the description of the prep stall logic circuitry (FIG. 7).

After cow E is released from the prep stall she proceeds along the cow passage 32 but she cannot pass the entry gate 42 of milk stall 26 because it is disposed across the passage way. Cow E is thus directed toward milk stall 26 but cannot enter until cow D is released.

After the operator has inspected cow D he directs the exit gate control handle to 171 to open. This opens the exit gate of milk stall 26 and releases cow D into the passage 32. Cow E proceeds into milk stall 26 as cow D exits and the operator throws the exit gate control handle 171 to "closed" to block the exit of cow E from the milk stall. Next, the operator actuates the entry gate close button 173. This switch is represented in the milk stall circuitry by entry gate close switch 250 shown in the milk stall circuit 182 (see FIG. 6). The entry gate close switch 250 has stop element 252 which can be overridden for jogging closure of the gate. The stop element 252 is activated by entry gate close switch 254 which is a circuitry representation of entry gate limit switch 166 (see FIG. 5). After the entry gate has been closed to the point that entry gate limit switch 166 is activated, further closing by jogging is achieved by repeatedly depressing entry gate close button 250.

The entry gate close switch 250 feeds a pneumatic signal to control terminal 256 via conduit 258. From control terminal 258 the signal is passed by conduit 260 to a control terminal 262, which is connected to the entry gate cylinder control valve 246. Signals received from contact terminal 262 actuate the entry gate control valve 246 to its close position and feeds air from the main air supply in conduit 108 to the retract side of the actuating cylinder 116, and exhausts the extend side, retracting the cylinder actuating arm and closing the entry gate 42.

When the entry gate closes to a position which actuates the entry gate limit switch 166, its circuit equivalent 254 passes a signal to the stop element 252 and the entry gate control valve stops the retracting of the actuating arm of cylinder 116. To position a cow forward and to the inside of the milk stall, the operator may then close the entry gate 42 beyond its initial closed position by activating the entry gate close button in the manner previously described. By moving the entry gate further closed in "jogs," the operator can position a cow of nearly any size in the most desirable place in the milk stall.

When the entry gate close switch 250 delivers a signal through the conduit 260, that signal also travels to the FF gate 236 via conduit 240. As previously explained, when the FF gate 236 receives a signal from its alternate input channel, that is, conduit 240, it resets itself for a signal from the main input channel, conduit 210.

In milk stall circuit 184 of the logic circuitry 180, the entry gate open button 172 is represented by manual entry gate open switch 264, the support arm control switch 178 is represented by the auto-entry gate open switch 266, the entry gate close button 173 is represented by the manual entry gate close switch 268, and the entry gate limit switch 164 is represented by entry gate close stop switch 269. The OR gates, NOT gate, FF gate and entry gate control valves, and the conduits connecting them perform the same functions and are assigned the same numbers as those in milk stall circuit 182. The control terminal 270 which connects the milk stall circuit 184 with the prep stall logic circuitry (FIG.

7), is differently numbered to separately identify the prep call signals from each of the three milk stalls 26, 28 and 30.

Likewise, in milk stall circuit 186 the milk stall 30 entry gate open button 172 is represented by manual entry gate open switch 272, the support arm contact switch 178 by auto-entry gate open switch 274, the entry gate close button by manual entry gate close switch 276, the entry gate limit switch 164 by entry gate close stop switch 278, and the prep stall call signal contact terminal is designated 280. All other elements are given the same numbers as in milk stall circuit 182.

Referring now to FIG. 7, the logic and control circuitry of the prep stall is designated generally 284. The prep stall circuit receives "call" signals from each of the three milk stalls 26, 28 and 30 via the corresponding prep stall call control terminals 242, 270 and 280 shown in the milking stall logic circuits 182, 184 and 186 (see FIG. 6). Signals entering the prep stall circuit 284 via control terminals 242 and 270 (from milk stall circuits 182 and 184) are directed to an OR gate 286 via conduits 288 and 290. Signals on either conduit produce an output signal from OR gate 286 on conduit 292 which, in turn, directs the signal to OR gate 294 on one of its input channels. The other input channel to OR gate 294 is from conduit 296 that is connected with prep stall call control terminal 280 (from milk stall circuit 186). If a signal is received by OR gate 294 on either conduit 292 or conduit 296, the OR gate produces an output signal to one input channel of a master AND gate 298 via conduit 300. Thus, if a signal is received on any of the prep stall call control terminals it is transmitted via the two OR gates 286 and 294 to one input channel of the master AND gate 298.

The second input channel of the master AND gate 298 is conduit 302 from the preparation timer sub-circuit 303. A signal is dispatched from the preparation timer sub-circuit 303 when preparation of a cow in the prep stall has been completed, in a manner hereafter described. Therefore, if the cow in the prep stall 24 has been fully prepared for milking, as indicated by a signal on conduit 302 and a prep stall call signal originates from any of the milk stalls, the master AND gate 298 will have simultaneous signals on both input channels, conduit 300 and conduit 302, and dispatch an output signal on conduit 304.

Conduit 304 is the input channel of an SR gate 306, the principal output of which is directed via conduit 308 to an MEM gate 310. The principal output of the MEM gate 310 is directed to one input channel of an OR gate 312 via conduit 314. The output of the OR gate 312 is directed to the "open" or extend side of the exit gate cylinder control valve 316 via conduit 318. The exit gate cylinder control valve controls the exit gate cylinder 130 on the prep stall 24, and upon receipt of a signal from OR gate 312, opens the prep stall exit gates to release a cow. Thus, an output signal on conduit 304 from the master AND gate 298 after clearing the SR gate 306, MEM gate 310, and OR gate 312, opens the exit gates of the prep stall.

The SR gate 306 is a set-reset gate, the operation of which is pass one signal and then shut down until it is reset. Thus, the SR gate prevents circuit confusion if further signals are transmitted by the master AND gate 298 after an initial "open" signal is passed to the exit gate cylinder control valve 316. The MEM gate 310 is a memory gate the function of which is to retain a signal once received for a sufficient period to permit a response by down line circuitry. The OR gate 312, in addition to the input from conduit 314, is adapted to receive an input from conduit 320 which is connected to manual exit gate open switch 322. The manual exit gate open switch 322 is a representation in the prep stall circuitry of the exit gate open button 154 on the prep stall control panel 106 (see FIG. 5). This switch initiates a manual override signal in conduit 320 which as an alternate input channel to OR gate 312 will initiate an output signal to the exit gate cylinder control valve 316 to open the exit gates by manual control. Thus, conduit 314 delivers the "open exit gate" command to the control valve 316 from the automatic mode and conduit 320 delivers this command for manual mode.

As previously noted, in order for the master AND gate 304 to deliver an output and initiate opening of the exit gates of the prep stall, a signal must be delivered from the preparation timer sub-circuit 303. The function of this sub-circuit is to initiate the operation of the udder washing device 84 and the feed dispenser 83 in prep stall 24, to time these operations, and to signal their completion to the master AND gate 298 on conduit 302. The preparation of a cow is commenced by the preparation timer sub-circuit 303, when contact switch 324 is closed. Contact switch 324 is a representation in the sub-circuit 303 of the operations switch 150 mounted on the rear or entry end of the prep stall and actuated when the entry gates close and engage the switch contact arm 152 (see FIG. 5). When closed the contact switch 324 delivers a signal via conduit 326 to a Ps gate 328. The Ps gate 328 is a pulse gate which prepares the signal from the contact switch into a gate operating pulse. The pulse from Ps gate 328 is transmitted to wash FF gate 330 and feed FF gate 332 via conduits 334, 336 and 338. The FF gates 330 and 332 are flip-flop gates and function by passing one signal from an input channel and then refusing to pass another until they are reset by a signal from a reset channel. The FF gates each pass an output signal via cnduits 340 and 342 to their respective function actuators via N gates 344 and 346. The N gates are "not" gates which pass a signal on their input channel to their output channel unless a signal is present on their alternate input or "not" channel. The conduits 340 and 342 are input channels to the N gates and these gates will pass a signal from these conduits to their respective output conduits 348 and 350 so long as no signals in present on their respective NOT channels, which are conduits 352 and 354.

A signal output on conduit 348 will actuate a pneumatic water valve in the udder wash supply pipes 88 and commence delivery of udder wash water through the nozzle 90 (see FIGS. 2, 3 and 4). The water valve is not shown physically but is represented in the sub-circuit 303 by block 356.

Similarly, an output signal on conduit 350 will actuate a pneumatic-electric switch in the electric circuit of the dispenser 83 and commence the delivery of feed into the prep stall feed trough 82 (see FIGS. 2, 3 and 4). The pneumatic-electric switch is not shown physically but is represented in sub-circuit 303 by block 358.

An output signal from FF gates 330 and 332, in addition to passing to the N gates 344 and 346 respectively, via conduits 340 and 342, also pass to a wash TIM gate 360 and a feed TIM gate 362 via conduits 364 and 366. The TIM gates 360 and 362 feed a wash ACC gate 368 and a feed ACC gate 370 respectively via conduits 372 and 374. And the ACC gates 368 and 370 pass their output signals to a wash AND gate 376 and a feed AND gate 378 respectively via conduits 380 and 382.

The TIM gates 360 and 362 are timers and the ACC gates 368 and 370 are accumulators. The wash TIM gate 360 and wash ACC gate 368 operate together as a time delay unit in a manner known in the art, to produce an output on conduit 380 in a predetermined time after an input signal is received on conduit 364. Feed TIM gate 362 and feed ACC gate 370 operate in a like manner to produce an output on conduit 382 after an input signal is received on conduit 366.

The AND gates 376 and 378 each have their second input channels connected to control air supply 384 via conduits 386 and 388, respectively. The control air supply provides a constant signal on bias. Thus, when either of these AND gates receive a signal on their first input channels via conduits 380 and 382, respectively, they pass an output signal on conduits 390 and 392 to a junction AND gate 394. Therefore, the junction AND produces an output signal to the master AND gate 298 on conduit 302 when both the wash time delay unit, comprising TIM gate 360 and ACC gate 368, and the feed time delay unit, comprising TIM gate 362 and ACC gate 370 produce output signals to their respective AND gates 376 and 378. When this occurs the output signals from wash AND gate 376 and feed AND gate 378 are transmitted to their respective N gates 344 and 346 via conduits 352 and 354, thereby shutting down the udder wash and the feed dispenser via the wash valve 356 and the feed switch 358.

To reset the preparation timer sub-circuit 303, a reset signal is transmitted to them from the MEM gate 310 via conduit 396 which connects to a wash reset OR gate 398 and a feed reset OR gate 400. The second input to each of the reset OR gates 398 and 400 is from the manual exit gate open switch 322 via conduits 406 and 408. Therefore, the reset OR gates 398 and 400 produce an output signal whenever the automatic mode transmits an "open" signal to the exit gate cylinder control valve 316 or such a signal is transmitted to the control valve by the manual mode using switch 322.

The output signals from the reset OR gates 398 and 400 are transmitted, respectively, to the wash FF gate 330 and the feed FF gate 332 to reset these gates for the reasons previously explained. Also, a reset pulse is transmitted from the feed FF gate 332 to the SR gate 306 via cnduit 410 to reset that gate for the reasons previously explained.

A constant signal is supplied by the control air supply 384 to the FF gates 330 and 332, and to the MEM gate 310, as well as the AND gates 376 and 378, via the channels indicated to bias these channels in a manner and for the purpose well known in the art.

Having explained how the exit gates of the prep stall 24 are opened, either by automatic mode or manual mode, the function of the other prep stall controls will now be described. As previously indicated, when the exit gates of prep stall 24 open the cow in that stall, cow E, for example (see FIG. 1), moves out of the stall into the passage 32 toward the milk stalls. As this occurs the cow strikes the exit wand 148 (see FIG. 5). This wand closes a switch represented in the prep stall circuitry by exit wand switch 412. This switch is connected to the "close" side of the exit gate cylinder control valve 316 and OR gate 414 and conduits 416 and 418. Conduit 414 is one channel of input to the OR gate 414, and conduit 418 is the output channel of this gate. The other input channel to OR gate 414 is from a manual exit gate close switch 420 via conduit 422. The manual exit gate close switch 420 is a circuitry representation of exit gate close button 156 on prep stall control panel 106. Thus, the exit gates 80 of the prep stall are, in automatic mode, closed by cow contact with the exit wand 148 via exit wand switch 412 and in the manual mode, by exit gate close button 156 via manual exit gate close switch 420.

When the exit gates close, the entry gates must be opened to permit another cow to enter the prep stall. For automatic mode this is accomplished by an entry gate open contact switch 424. This switch represents in the circuitry 284 the exit gate limit switch 147, which is so mounted that it is actuated when the exit gates close and strike its contact arm 149 (see FIG. 5). The entry gate open contact switch 424 provides an "open" signal, upon its actuation, to the entry gate cylinder control valve 426 which controls the entry gate cylinder. This "open" signal is transmitted to the control valve 426 through a Ps gate 428 which forms the signal into a control pulse, and OR gate 430 via conduits 432, 434 and 436. The output of Ps gate 428 is delivered to one input channel of the OR gate 430 via conduit 434 and the OR gate output signal is transmitted to the cylinder control valve 426 via conduit 436. The second input to the OR gate 430 is derived from manual entry gate open switch 438 via conduit 440. The manual entry gate open switch 438 is representative in the circuitry of the entry gate open button 158 on prep stall control panel 106 (see FIG. 5). Thus, the entry gates 78 of the prep stall 24 may be opened either automatically upon closing of the exit gates 80, or manually by entry gate open button 158.

After the entry gates 78 open a cow may enter the prep stall, and as she does she will strike entry wand 142 and actuate entry switch 140 (see FIG. 5). For automatic mode, the entry gates will be closed by the actuation of the wand switch 140 which is represented in the circuitry by entry wand switch 442.

The entry wand switch 442, upon actuation, transmits a "close" signal to the entry gate cylinder control valve 426 through an OR gate 444 via conduits 446 and 448. The conduit 446 provides one channel of input to the OR gate 444 and conduit 448 provides the output channel. The other input to the OR gate 444 is derived from a manual entry gate close switch 450 via conduit 452. The manual entry gate close switch 450 is a circuitry representation of entry gate close button 160 on the prep stall control panel 106 (see FIG. 5). Thus, in automatic mode, the entry gate 78 is closed by the cow contacting the entry wand 142 via entry wand switch 442 and in manual mode it is achieved through actuation of the entry gate close button 160 via the manual entry gate close switch 450.

From this description of the physical layout and stall structure, the actuating devices and control panels, the logic and control circuitry, and the operation thereof, it should be understood that a very versatile and convenient automated milking parlor is provided by this invention. The arrangement of the stalls and cow flow passages minimizes the movement required of the operator. The milk is drawn and delivered to storage in a manner which avoids any possible contamination and is separated to a maximum degree from dirt areas such as stall and passage floors.

The versatility of the invention is evidenced by the ability of the operator to operate in automatic or manual modes, and to intermingle the two where convenient. Both modes are continuously available and the controls are so arranged that no system confusion results from one mode overriding the other.

Most significant to the invention is the ability to provide this high degree of automation and operating versatility with a control and logic system, and with power actuators, which are substantially all pneumatic, thus avoiding the danger to personnel and the risk of malfunction which results from the use of electrical circuits and devices in a water exposed area.

Also important is the ease with which the capacity of the described embodiment may be expanded by the addition of milking stalls, and where necessary, prep stalls.

It should also be understood that this invention is fully capable of providing the advantages and achieving the objects heretofore attributed to it.

I claim:

1. An automated milking parlor comprising:
   a barn having a pair of milk stall banks disposed in spaced parallel relationship, each with an entry end and an exit end, and an operator's pit disposed between said banks;
   a plurality of milk stalls in each of said stall banks, said milk stalls in each bank being disposed to align cows positioned therein in head to tail alignment parallel to and adjacent said pit, with their heads directed toward the exit end of said stall bank;
   a cow flow passage in each of said banks disposed parallel to said milk stalls and on the opposite side thereof from said pit, said passage having an entry at the entry end of each stall bank and an exit at the exit end of each stall bank;
   a prep stall at the entry end of each stall bank disposed to receive cows, contain them and release them into said passage for travel therealong to a selected one of said milk stalls;
   milk stall gate means operatively associated with each of said milk stalls for receiving, containing and releasing cows;
   milk stall gate actuating means operatively associated with each of said milk stall gate means and interconnected with said milk stall gate means and disposed, upon activation thereof, to operate said milk stall gate means;
   prep stall gate means operatively associated with said prep stall for receiving, containing and releasing cows;
   prep stall actuating means operatively associated with said prep stall and interconnected with said prep stall gate means, and disposed, upon activation thereof, to operate said prep stall gate means;
   power means interconnected with said milk stall gate actuating means and said prep stall gate actuating means and disposed to power the mechanical operation thereof, said power means includes a source of pressurized gas and conduits interconnecting said source with said milk stall gate actuating means and said prep stall gate actuating means; and
   control means interconnected with said power means and disposed to control the activation of said milk stall gate actuating means and said prep stall gate actuating means, said control means includes a source of pressurized gas and a plurality of pneumatically responsive control and logic elements interconnected by pneumatic conduits.

2. An automated milking parlor as described in claim 1 in which:
   said operator's pit includes a floor disposed at a level substantially lower than the floors of said milk stall banks to permit easy access of an operator standing on said pit floor to the udder of cows standing in said milk stalls and on said stall bank floors.

3. An automated milking parlor as described in claim 1 in which:
   said milk stall entry gate is pivotally mounted on said milk stall and has a distal end disposed to move from an open position, in which it extends across and blocks said cow flow passage to travel therebeyond, to a plurality of close positions progressing from a wide close position and a narrow close position, in which said distal end wraps about the hind quarters of a cow in said milk stall and urges said cow forward and toward the pit side of said milk stall as said distal end progresses from its wide close position toward its narrow close position; and
   said control means havng a manually operable entry gate close control device disposed to activate said milk stall gate actuating means to progressively close said entry gate distal end from said wide close position to said narrow close position.

4. An automated milking parlor as described in claim 1 in which:
   said prep stall gate means includes an entry gate disposed to receive cows at the entry end of said stall bank and an exit gate disposed to release cows into the entry of said cow flow passage, said gates each consisting a pair of pivotally mounted half gates, one mounted on each side of said stall, said half gates being movable in unison from an open position wherein said gate halves are parallel to said stall sides, to a closed position wherein said gate halves are normal to said stall sides, and have their distal portions adjacent but spaced apart a distance sufficient to accommodate the neck of a cow.

5. An automated milking parlor as described in claim 1 in which:
   said control means includes a prep stall control circuit operatively associated with the prep stall in each stall bank and each having a milk stall call signal receiving sub-circuit disposed to receive call signals from any one of said milk stalls in the same stall bank, an exit gate open sub-circuit interconnected with said milk stall call sub-circuit and disposed to activate said prep stall gate actuating means to open said exit gate in response to a signal from any one of said milk stalls in the same stall bank, an exit gate close sub-circuit disposed to activate said prep stall gate actuating means to close said exit gate upon closure by a cow contact of an exit wand switch disposed forwardly of said exit gate in said cow flow passage and interconnected in said sub-circuit, an entry gate open sub-circuit disposed to activate said prep stall gate actuating means to open said entry gate upon actuation of an exit gate contact switch disposed for engagement by said exit gate upon its closure and interconnected in said sub-circuit, and an entry gate close sub-circuit disposed to activate said prep stall gate actuating means to close said entry gate upon closure by cow contact of an entry wand switch disposed inside said prep stall forwardly of said entry gate and interconnected in said sub-circuit.

6. An automated milking parlor as described in claim 1 in which:

said prep stall includes an udder wash disposed to deliver a predetermined quantity of water spray on the udder of a cow contained therein, a feed trough, a feed dispenser disposed to deliver a predetermined quantity of feed to said feed trough; and said control means includes a prep stall control circuit operatively associated with the prep stall in each stall bank and each having a milk stall call signal receiving sub-circuit disposed to receive call signals from any one of said milk stalls in the same stall bank, an exit gate open sub-circuit interconnected with said milk stall call sub-circuit and disposed to activate said prep stall gate actuating means to open said exit gate in response to a signal from any one of said milk stalls in the same stall bank, an exit gate close sub-circuit disposed to activate said prep stall gate actuating means to close said exit gate upon closure by a cow contact of an exit wand switch disposed forwardly of said exit gate in said cow flow passage and interconnected in said sub-circuit, an entry gate open sub-circuit disposed to activate said prep stall gate actuating means to open said entry gate upon actuation of an exit gate contact switch disposed for engagement by said exit gate upon its closure and interconnected in said sub-circuit, and an entry gate close sub-circuit disposed to activate said prep stall gate actuating means to close said entry gate upon closure by cow contact of an entry wand switch disposed inside said prep stall forwardly of said entry gate and interconnected in said sub-circuit, an udder wash control sub-circuit disposed to initiate said udder wash water spray upon actuation of an entry gate contact switch disposed for engagement by said entry gate upon its closure and interconnected in said sub-circuit, and disposed to terminate said water spray after a predetermined time determined by a timer interconnected in said sub-circuit, and a feed dispenser subcircuit disposed to initiate operation of said feed dispenser upon activation of an entry gate contact switch disposed for engagement by said entry gate upon its closure and interconnected in said sub-circuit, and disposed to terminate said feed dispensing after a predetermined time determined by a timer interconnected in said sub-circuit.

7. An automated milking parlor as described in claim 6 in which:

said milk stall call signal receiving sub-circuit is formed of pneumatic elements interconnected by pneumatic conduits in a manner which monitors call signal conduits from each of said milk stalls and passes a single selected signal therefrom, said udder wash control sub-circuit and said feed dispenser sub-circuit are so interconnected with said milk stall call signal receiving circuit that said selected signal therefom will actuate said exit gate actuating means only after termination of both said udder wash and said feed dispenser has occurred, said exit gate open sub-circuit is formed of pneumatic elements interconnected by pneumatic conduits, said elements being so selected and connected that said sub-circuit will, in addition to activating said exit gate actuating means to open said exit gate in response to said milk stall call receiving sub-circuit, activate said exit gate actuating means to open said exit gate in response to a manual mode signal from a manual switch regardless of the condition of said udder wash sub-circuit and said feed dispenser sub-circuit, said exit gate close sub-circuit is formed of pneumatic elements interconnected by pneumatic conduits, said elements being so selected and connected that said sub-circuit will activate said exit gate close actuating means to close said exit gate in response to a manual mode signal from a manual switch as well as from said exit wand switch, said entry gate open sub-circuit is formed of pneumatic elements interconnected by pneumatic conduits, said elements being so selected and connected that said sub-circuit will activate said entry gate actuating means to open said entry gate in response to a manual mode signal from a manual switch as well as from said exit gate contact switch, and said entry gate close sub-circuit is formed of pneumatic elements interconnected by pneumatic conduits, said elements being so selected and connected that said sub-circuit will activate said entry gate actuating means to close said entry gate in response to a manual mode signal from a manual switch as well as from said entry wand switch.

8. An automated milking parlor as described in claim 5 in which said prep stall control circuit of said control means further includes:

a manually operable manual mode exit gate open switch interconnected with said exit gate open sub-circuit and disposed to activate said gate actuating means to open said exit gate upon manual operation thereof regardless of the condition of said milk stall call signal receiving sub-circuit, a manually operable manual mode exit gate close switch interconnected with said exit gate close sub-circuit and disposed to activate said gate actuating means to close said exit gate upon manual operation thereof regardless of the condition of said exit wand switch, a manually operable manual mode entry gate open switch interconnected with said entry gate open sub-circuit and disposed to activate said gate actuating means to open said entry gate upon manual operation thereof regardless of the condition of said exit gate contact switch, and a manually operable manual mode entry gate close switch interconnected with said entry gate close sub-circuit and disposed to activate said gate actuating means to close said entry gate upon manual operation thereof regardless of the condition of said entry wand switch.

9. An automated milking parlor as described in claim 5 in which said control means further includes a milk stall control circuit operatively associated with each milk stall in each stall bank, each having:

an exit gate open sub-circuit disposed to activate said milk stall gate actuating means to open said exit gate, said sub-circuit being responsive to a manually operable exit gate open switch interconnected therewith, an exit gate close sub-circuit disposed to activate said milk stall gate actuating means to close said exit gate, said sub-circuit being responsive to a manually operable exit gate close switch interconnected therewith, an entry gate open sub-circuit disposed to activate said milk stall gate actuating means to open said entry gate, said sub-circuit being responsive to a manual operable entry gate open switch interconnected therein, an entry gate close sub-circuit disposed to activate said milk stall gate actuating means to close said entry gate, said sub-circuit being responsive to a manually operable entry gate close switch interconnected therein, and a prep stall call channel interconnected between said milk stall entry gate open sub-circuit and said milk stall call signal receiving sub-circuit of said prep stall control circuit.

10. An automated milking parlor as described in claim 8 in which said control means further includes a milk stall control circuit operatively associated with each milk stall in each milk stall bank, each having:

an exit gate open sub-circuit disposed to activate said milk stall gate actuating means to open said exit gate, said sub-circuit having pneumatic control elements interconnected by pneumatic conduits and being responsive to a manually operable exit gate open switch interconnected therein, an exit close sub-circuit disposed to activate said milk stall gate actuating means to close said exit gate, said sub-circuit having pneumatic control elements interconnected by pneumatic conduits and being responsive to a manually operable exit gate close switch interconnected therein, an entry gate open sub-circuit disposed to activate said milk stall gate actuating means to open said entry gate, said sub-circuit having pneumatic control elements interconnected by pneumatic conduits and being selectively responsive to a manually operable entry gate open switch interconnected therein and an automatically operable entry gate open switch operatively associated with an automatic shutdown mechanism of an automatic milking machine operatively associated with said milk stall, an entry gate close sub-circuit disposed to activate said milk stall gate actuating means to close said entry gate, said sub-circuit having pneumatic control elements interconnected by pneumatic conduits and being responsive to manually operable entry gate close, positive throw, switch interconnected therein, normally operably by manual contact therein, and said sub-circuit further having an entry gate close stop switch disposed for contact by said entry gate when said distal end closes to said wide close position and actuable thereby to deactivate said entry gate close, positive throw, switch and thereafter to condition said entry gate close switch to operate only while manually held in its activate position, whereby said distal end of said entry gate may be further closed progressively from said wide close position to a narrow close position by selectively manually holding said entry gate close switch in its activate position, a prep stall can channel having a pneumatic conduit interconnected between said milk stall entry gate open sub-circuit and said milk stall call signal receiving sub-circuit of said prep stall control circuit, and milk stall interlock sub-circuits interconnected between each of said milk stalls in said stall bank and disposed to indicate to other milk stalls in said stall bank the open condition of the entry gate of a milk stall, said interlock subcircuits each having a pneumatic entry gate contact switch disposed for activation upon opening of the entry gate of the milk stall, and pneumatic elements and conduits interconnecting said contact switch with the entry gate open sub-circuits of each of the other milk stalls.

11. In an automated milking parlor having a plurality of milk stalls in which cows are first prepared for milking and then released to one of said milk stalls for milking, a milk stall comprising:

a stall having a first side, a second side, an entry, and an exit;

an exit gate pivotally mounted on said second side of said stall and having a distal end pivotally movable from a closed position across said stall exit to an open position with said distal end swung outward from said stall exit;

an entry gate pivotally mounted on said second side of said stall and having a distal end pivotally movable from an open position with said distal end swung outwardly from said entry to a close position across said stall entry, said distal end of said entry gate being contoured to fit about the hind quarters of a cow and urge said cow forwardly and toward the first side of said stall when said entry gate is moved into its closed position;

a pneumatically operable entry gate actuator interconnected between said stall and said exit gate and activatable to pivotally move said exit gate between said open position and said closed positions;

a pneumatically operable exit gate actuator interconnected between said stall and said exit gate and activatable to pivotally move said exit gate between said open position and said closed position;

a source of pneumatic power interconnected with said gate actuators and disposed to provide power for pneumatic actuation thereof; and a milk stall control circuit having pneumatic elements interconnected by pneumatic conduits and disposed to control the activation of said gate actuators.

12. An automated milking parlar as described in claim 11 in which:

said entry gate actuator is further activatable to pivotally move said entry gate between said open position and a progression of closed positions between a wide close position and a narrow close position; and said milk stall control circuit includes an entry gate close sub-circuit having a manually operable, positive throw, pneumatic entry gate close switch disposed to activate said entry gate actuator to pivotally move said entry gate distal end from its open position toward its closed position, a pneumatic entry gate contact switch disposed for engagement and actuation by said distal end of said entry gate when said entry gate reaches said wide close position and to thereupon deactivate the positive throw action of said entry gate close switch and stop said entry gate actuator whereby said entry gate can be further closed progressively from said wide close position toward said narrow close position only by manually holding said entry gate close switch in its activate position until the desired additional closure is achieved.

13. An automated milking parlor as described in claim 11 in which said milk stall control circuit includes:
- an exit gate open sub-circuit having a manually operable pneumatic exit gate open switch interconnected therein by pneumatic conduits and disposed to activate said exit gate actuator to open said exit gate,
- an exit gate close sub-circuit having a manually operable pneumatic exit gate close switch interconnected therein by pneumatic conduits and disposed to activate said exit gate actuator to close said exit gate,
- an entry gate open sub-circuit having a manually operable pneumatic entry gate open switch disposed to activate said entry gate actuator to open said entry gate by manual mode, and an automatic entry gate open switch interconnected with an operable by the automatic shutdown mechanism of an automatic milking machine associated with said milk stall, said automatic entry gate open switch being disposed to activate said entry gate actuator to open said entry gate by automatic mode, and both said manually operable entry gate open switch and said automatic entry gate open switch being interconnected into said sub-circuit through a pneumatic signal selector gate by pneumatic conduits, and having a pneumatic prep stall call signal output conduit disposed to signal said prep stall to release a cow when said entry gate is opened,
- an entry gate close sub-circuit having a manually operable positive throw,
- and an interlock sub-circuit disposed to receive signals via pneumatic conduits from other milk stalls whenever an entry gate of said milk stalls is open and having pneumatic signal selector and signal blocking elements interconnected by pneumatic conduits to block activating signals from either said manually operable or said automatic switches when an entry gate on one of said other milk stalls is open.

14. In an automated milking parlor having a plurality of milk stalls in which cows are first prepared for milking and then released to one of said milk stalls for milking, a prep stall comprising:
- a stall having a first side, a second side, an entry and an exit,
- an entry gate pivotally mounted on said stall and pivotally movable from a closed position across said stall entry to an open position clear of said stall entry,
- an exit pivotally mounted on said stall and pivotally movable from a closed position across said stall exit to an open position clear of said stall exit,
- a pneumatic entry gate actuator interconnected between said stall and said entry gate and activatable to pivotally move said entry gate between said open positon and said closed position,
- a pneumatic exit gate actuator interconnected between said stall and said exit gate and activatable to pivotally move said exit gate between said open position and said closed position,
- a pneumtic power source interconnected with said pneumatic gate actuators,
- and a prep stall control circuit having pneumatic elements interconnected by pneumatic conduits, said control circuit being disposed to control the activation of said actuators.

15. A prep stall as described in claim 14 in which: said prep stall control circuit includes,
- a prep stall call receiving sub-circuit having a plurality of incoming pneumatic conduits each interconnected with a different milk stall, pneumatic signal selector elements interconnected by pneumatic conduits to select and process call signal from said milk stalls to produce an output signal in response thereto,
- an exit gate open sub-circuit having a pneumatic, manually operable, exit gate open switch, and a pneumtic call signal conduit interconnected with said prep stall call receiving sub-circuit and disposed to receive output signals therefrom, said manually operable switch and said call signal conduit being so interconnected by pneumatic elements and conduits that said manually operable switch activates said exit gate actuator to open said exit gate in a manual mode and said call signal conduit activates said exit gate actuator to open said exit gate in an automatic mode,
- an exit gate close sub-circuit having a pneumatic, manually operable exit gate close switch, and a pneumatic cow contact operable exit wand switch disposed in the patch of a cow exiting said prep stall, said manually operable switch and said exit wand switch being so interconnected by pneumatic elements and conduits that said manually operable switch activates said exit gate actuator to close said exit gate in manual mode and said exit wand switch activates said exit gate actuator to close said exit gate in an automatic mode,
- an entry gate open sub-circuit having a pneumatic, manually operable, exit gate open switch, and a pneumatic exit gate contact operable contact switch disposed for engagement and actuation by said exit gate upon closing, said manually operable switch activates said entry gate actuator to open said entry gate in a manual mode and said exit gate contact switch activates said entry gate actuator to open said entry gate in an automatic mode,
- and an entry gate close sub-circuit having a pneumatic, manually operable, close switch, and a pneumatic, cow entry contact operable wand switch disposed in the path of a cow entering said prep stall, said manually operable switch and said entry wand switch so interconnected by pneumatic elements and conduits that said manually operable switch activates said entry gate actuator to close said entry gate in a manual mode, and said entry wand switch activates said entry gate actuator to close said entry gate in an automatic mode.

16. A prep stall as described in claim 15 in which: said prep stall further includes an udder wash disposed to spray liquid on the udder of a cow positioned therein to prepare said cow for milking; and said prep stall control circuit further includes,
- an udder wash control sub-circuit having a pneumatic entry gate contact switch disposed for engagement and actuation by said entry gate upon closure thereof, a pneumatically operable udder wash control valve, and a pneumatic timer circuit, all so interconnected by pneumatic elements and conduits that actuation of said entry gate contact switch activates said udder wash control valve to initiate the delivery of liquid spray to said cow and start said timer circuit, and said timer circuit after a predetermined time deactivates said udder wash control valve to terminate the delivery of liquid spray to said cow, and prep ready interlock sub-circuit interconnected between said udder wash sub-circuit and said automatic mode of said exit gate open sub-circuit, said prep ready interlock subcircuit having a pneumatic elements and conduits so interconnected that activation of said exit gate actuator by said call signal conduit to open said exit gate is blocked until said udder wash has been activated, timed and terminated by said udder wash control sub-circuit.

17. A prep stall as described in claim 14 in which:

said stall sides are disposed in parallel spaced relationship and said entry is defined by their entry ends and said exit is defined by their exit ends;

said entry gate is formed of a pair of half fates each pivotally mounted on an opposite side of said stall adjacent said entry and interconnected with said entry gate actuator by linkage which simultaneously pivots both half gates outwardly of the entry of said prep stall into substantial alignment with said stall sides upon activation of said entry gate actuator to open said entry gate and simultaneously pivots both half gates inwardly into a substantially normal relationship with said stall sides with the distal ends of said half gates spaced apart a distance substantially equal to the thickness of a cow's neck upon activation of said entry gate actuator to close said entry gate;

said exit gate is formed of a pair of half gates each pivotally mounted on an opposite side of said stall adjacent said exit and interconnected with said exit gate actuator by linkage which simultaneously pivots both half gates inwardly of the exit of said prep stall into substantially parallel and abutting relationship with said stall sides upon actuation of said exit gate actuator to open said exit gate and simultaneously pivots both half gates inwardly into a substantially normal relationship with said stall sides with the distal ends of said half gates spaced apart a distance substantially equal to the thickness of a cow's neck, upon activation of said exit gate actuator to close said exit gate;

an udder wash device disposed to wash the udder of a cow positioned in said prep stall for a predetermined time;

a feed trough; and a feed dispensing device disposed to deliver a predetermined quantity of feed into said trough.

18. A prep stall as described in claim 17 in which said prep stall control circuit includes:

a prep stall call receiving sub-circuit having a plurality of incoming pneumatic conduits each interconnected between a different one of said milk stalls and an input channel of a pneumatic OR gate connected in said sub-circuit and disposed to select signals from said incoming conduits and deliver an output signal, and a pneumatic sub-circuit output conduit disposed to transmit said output signal, an exit gate open sub-circuit having a pneumatic manually operable exit gate open switch interconnected by pneumatic conduit with a first input channel of pneumatic OR gate and having the other input channel of said OR gate interconnected with said output conduit of said prep stall call receiving sub-circuit, and having the output channel of said OR interconnected by pneumatic conduit with the open side of a pneumatic actuator valve disposed to actuate said exit gate actuator, whereby a signal from either said prep stall call receiving sub-circuit or said manually operable exit gate open switch will activate said exit gate actuator to open said exit gate, an exit gate close sub-circuit having a pneumatic manually operable exit gate close switch interconnected by pneumatic conduit with one input channel of a pneumatic OR gate, and a pneumatic cow contact operable exit wand switch disposed for actuation by a cow exiting said prep stall and interconnected by pneumatic conduit with the other input channel of said pneumatic OR gate, and having the output channel of said pneumatic OR gate interconnected by pneumatic conduit with the close side of a pneumatic actuator valve disposed to actuate said exit gate actuator, whereby a signal from either said exit wand switch or said manually operable exit gate close switch will activate said exit gate actuator to close said exit gate, an entry gate open sub-circuit having a pneumatic manually operable entry gate open switch interconnected by pneumatic conduit with one input channel of a pneumatic OR gate, and a pneumatic exit gate contact switch disposed for actuation by said exit gate upon closure thereof and interconnected by pneumatic conduit with the other input channel of said pneumatic OR gate, and having the output channel of said OR gate interconnected by pneumatic conduit with the open side of a pneumatic actuator valve disposed to actuate said entry gate actuator to open said entry gate, whereby a signal from either said exit gate contact switch or said manually operable entry gate open switch will activate said entry gate actuator to open said entry gate, an entry gate close sub-circuit having a pneumatic manually operable entry gate close switch interconnected by pneumatic conduit with one input channel of a pneumatic OR gate, and a pneumatic cow contact operable entry wand switch disposed for actuation by a cow entering said prep stall and interconnected by pneumatic conduit with the other input channel of said pneumatic OR gate, and having the output channel of said OR gate interconnected by pneumatic conduit with the close side of a pneumatic actuator valve disposed to actuate said entry gate actuator to close said entry gate, whereby a signal from either said entry wand switch or said manually operable entry gate close switch will activate said entry gate actuator to close said entry gate, an udder wash sub-circuit having a pneumatic entry gate contact switch disposed for actuation by said entry gate upon closure thereof and interconnected by pneumatic conduit to an input channel of a pneumatic flip-flop element connected to the main input channel of a pneumatic NOT gate and having the output channel of said NOT gate interconnected by pneumatic conduit to a pneumatically controlled valve disposed to initiate said udder wash when activated, and having a pneumatic timer circuit interconnected between said output channel of said flip-flop element and the blocking input channel of said NOT gate whereby said NOT gate will block the passage of a signal on said main input channel to said udder wash control valve thereby deactivating said valve and terminating said udder wash when said timer circuit dispatches a signal, and having a pneumatic timer circuit output signal conduit, a feed dispenser sub-circuit having a pneumatic entry gate contact switch disposed for actuation by said entry gate upon closure thereof and interconnected by pneumatic conduit to an input channel of a pneumatic flip-flop element, and having an output channel of said flip-flop element connected to the main input channel of a pneumatic NOT gate, and having the output channel of said NOT gate interconnected by pneumatic conduit to a pneumatically controlled switch disposed to initiate said feed dispensing by said feed dispenser when activated, and having a pneumatic timer circuit interconnected between said output channel of said flip-flop element and the blocking input channel of said NOT gate, whereby said NOT gate will block the passage of a signal on said main input channel to said feed dispenser control switch thereby deactivating said switch and terminating said feed dispensing when said timer circuit dispatches a signal, and having a pneumatic timer circuit output signal conduit, a timer circuit junction sub-circuit having a pneumatic AND gate with one input channel thereof interconnected with the timer circuit output conduit of said udder wash sub-circuit and the other input channel interconnected with the timer circuit output conduit of said feed dispenser sub-circuit, and having the output channel of said AND gate interconnected with a pneumatic output conduit, whereby no output signal is produced in said output conduit until both said udder wash timer circuit and said feed dispenser timer circuit have produced an output signal to terminate said udder wash and said feed dispensing, and a prep ready interlock sub-circuit having a pneumatic AND gate with one input channel interconnected with the output conduit of said prep stall call receiving sub-circuit and the other input channel interconnected with said output conduit of said timer circuit junction sub-circuit, and having the output channel of said AND gate interconnected with said first input channel of said OR gate in said exit gate open sub-circuit, whereby no signal from said prep stall call receiving sub-circuit is delivered to said OR gate until said timer circuit junction sub-circuit produces an output signal.

19. In an automated milking parlor having a plurality of milk stalls wherein cows are milked by automatic milking machines, a prep stall in which cows are prepared for milking by an udder wash spray device controlled by a pneumatically activated valve and then released to said milk stalls, and in which said milk stalls and said prep stall each have entry gates and exit gates operated by pneumatic actuators powered by a pneumatic power supply, control circuit for controlling the activation of said gates and said udder wash control valve comprising:

a milk stall control circuit operatively associated with each of said milk stalls including, an exit gate open sub-circuit having a manually operable exit gate open switch interconnected therein and disposed to activate said exit gate actuator to open said exit gate, an exit gate close sub-circuit having a manually operable exit gate close switch interconnected therein and disposed to activate said exit gate actuator to close said exit gate, an entry gate open sub-circuit an entry gate open contact switch interconnected with an automatic shutdown mechanism of the automatic milking machine associated with said milk stall and actuatable upon shutdown of said milking machine said contact switch being interconnected in said sub-circuit and disposed, upon actuation, to activate said entry gate actuator and open said entry gate, and said sub-circuit having a prep stall call dispensing channel, an entry gate close sub-circuit having an entry gate close switch, said switch being operable upon manual contact to actuate by positive throw and being interconnected in said sub-circuit and disposed to activate said entry gate actuator to close said entry gate, and said sub-circuit having an entry gate contact switch disposed for engagement and actuation by said entry gate upon closure thereof to a wide close position, said contact switch being so interconnected and disposed in said sub-circuit that upon actuation it deactivates said positive throw of said entry gate close switch, whereby further activation of said close switch and said entry gate actuator is achieved only by manually holding said close switch in its activate position and said entry gate can be further closed progressively to a narrow close position thereby, an entry gate open interlock sub-circuit interconnected with said entry gate open sub-circuit and having entry gate interlock switches in each of the other milk stalls disposed for actuation upon opening of said entry gates of said other milk stalls and so interconnected and disposed in said entry gate interlock sub-circuit that said entry gate open sub-circuit that said entry gate sub-circuit will not function to activate said entry gate actuator to open said entry gate if an entry gate of one of said other milk stalls is open;

and a prep stall control circuit including:

a prep stall call receiving sub-circuit disposed to receive call signals from the prep stall call dispensing channel of the entry gate open sub-circuits of each of said milk stalls and thereupon to deliver a prep stall call signal on an output channel interconnected in said sub-circuit, a prep stall exit gate open sub-circuit interconnected with said prep stall call receiving sub-circuit and disposed to receive a call signal from said output channel thereof to activate said prep stall exit gate actuator and open said exit gate, an exit gate close sub-circuit having a cow contact exit wand switch interconnected therein and disposed for engagement and actuation by a cow exiting said prep stall, said exit gate wand switch being so interconnected in said sub-circuit as to activate said exit gate actuator to close said exit gate when it is activated, an entry gate open sub-circuit having an exit gate contact switch disposed for engagement and actuation by said exit gate upon closure thereof, said exit gate contact switch being so interconnected in said sub-circuit as to activate said entry gate actuator to open said entry gate when it is activated, an entry gate close sub-circuit having a cow contact entry wand switch disposed for engagement and actuation by a cow entering said prep stall, said entry wand switch being so interconnected and disposed in said sub-circuit as to activate said entry gate actuator and close said entry gate when it is actuated, and an udder wash control sub-circuit having a control valve disposed to initiate and terminate said udder wash and an entry gate contact switch disposed for engagement and actuation by said entry gate upon closure thereof, said entry gate contact switch being so interconnected and disposed in said sub-circuit as to activate said control valve when said switch is actuated, and said sub-circuit having a timer circuit disposed to deactivate said control valve after a predetermined time.

20. A control circuit as described in claim 19 in which:

said milk stall control circuit further includes all of said elements in said sub-circuits being pneumatic and being interconnected by pneumatic conduits, and said milk stall entry gate open sub-circuit having, in addition to said entry gate open contact switch, a manually operable entry gate open switch interconnected therein and disposed to activate said exit gate actuator to open said entry gate; and said prep stall control circuit further includes all of said elements in said sub-circuits being pneumatic and being interconnected by pneumatic conduits, and said exit gate open sub-circuit having, in addition to said prep stall call receiving conduit, a manually operable exit gate open switch interconnected therein to activatable said exit gate actuator and open said exit gate, said exit gate close sub-circuit having, in addition to said exit wand switch, a manually operable exit gate close switch interconnected therein to activate said exit gate actuator and open said exit gate, said entry gate open sub-circuit having, in addition to said exit gate contact switch, a manually operable entry gate open switch interconnected therein to activate said entry gate actuator and open said entry gate, said entry gate close sub-circuit having, in addition to said entry wand switch, a manually operable entry gate close switch interconnected therein to activate said entry gate actuator and close said entry gate.

21. A control circuit as described in claim 20 in which:

said prep stall control circuit further includes:

said prep stall call receiving sub-circuit having a plurality of incoming pneumatic conduits each interconnected between a different one of said milk stalls and an input channel of a pneumatic OR gate connected in said sub-circuit and disposed to select signals from said incoming conduits and deliver an output signal, and a pneumatic sub-circuit output conduit disposed to transmit said output signal, said exit gate open sub-circuit having a pneumatic manually operable exit gate open switch interconnected by pneumatic conduit with a first input channel of a pneumatic OR gate and having the other input channel of said OR gate interconnected with said output conduit of said prep stall call receiving sub-circuit, and having the output channel of said OR interconnected by pneumatic conduit with the open side of a pneumatic actuator valve disposed to actuate said exit gate actuator, whereby a signal from either said prep stall call receiving sub-circuit or said manually operable exit gate open switch will activate said exit gate actuator to open said exit gate, said exit gate close sub-circuit having a pneumatic manually operable exit gate close switch interconnected by pneumatic conduit with one input channel of a pneumatic OR gate, and a pneumatic cow contact operable exit wand switch disposed for actuation by a cow exiting said prep stall and interconnected by pneumatic conduit with the other input channel of said pneumatic OR gate, and having the output channel of said pneumatic OR gate interconnected by pneumatic conduit with the close side of a pneumatic actuator valve disposed to actuate said exit gate actuator, whereby a signal from either said exit wand switch or said manually operable exit gate close switch will activate said exit gate actuator to close said exit gate, said entry gate open sub-circuit having a pneumatic manually operable entry gate open switch interconnected by pneumatic conduit with one input channel of a pneumatic OR gate, and a pneumatic exit gate contact switch disposed for actuation by said exit gate upon closure thereof and interconnected by pneumatic conduit with the other input channel of said pneumatic OR gate, and having the output channel of said OR gate interconnected by pneumatic conduit with the open side of a pneumatic actuator valve disposed to actuate said entry gate actuator to open said entry gate, whereby a signal from either said exit gate contact switch or said manually operable entry gate open switch will activate said entry gate actuator to open said entry gate, said entry gate close sub-circuit having a pneumatic manually operable entry gate close switch interconnected by pneumatic conduit with one input channel of a pneumatic OR gate, and a pneumatic cow contact operable entry wand switch disposed for actuation by a cow entering said prep stall and interconnected by pneumatic conduit with the other input channel of said pneumatic OR gate, and having the output channel of said OR gate interconnected by pneumatic conduit with the close side of a pneumatic actuator valve disposed to actuate said entry gate actuator to close said entry gate, whereby a signal from either said entry wand switch or said manually operable entry gate close switch will activate said entry gate actuator to close said entry gate, an udder wash sub-circuit having a pneumatic entry gate contact switch disposed for actuation by said entry gate upon closure thereof and interconnected by pneumatic conduit to an input channel of a pneumatic flip-flop element connected to the main input channel of a pneumatic NOT gate and having the output channel of said NOT gate interconnected by pneumatic conduit to a pneumatically controlled valve disposed to initiate said udder wash when activated, and having a pneumatic timer circuit interconnected between said output channel of said flip-flop element and the blocking input channel of said NOT gate whereby said NOT gate will block the passage of a signal on said main input channel to said udder wash control valve thereby deactivating said valve and terminating said udder wash when said timer circuit dispatches a signal, and having a pneumatic timer circuit output signal conduit, a feed dispenser sub-circuit having a pneumatic entry gate contact switch disposed for actuation by said entry gate upon closure thereof and interconnected by pneumatic conduit to an input channel of a pneumatic flip-flop element, and having an output channel of said flip-flop element connected to the main input channel of a pneumatic NOT gate, and having the output channel of said NOT gate interconnected by pneumatic conduit to a pneumatically controlled switch disposed to initiate said feed dispensing by said feed dispenser when activated, and having a pneumatic timer circuit interconnected between said output channel of said flip-flop element and the blocking input channel of said NOT gate, whereby said NOT gate will block the passage of a signal on said main input channel to said feed dispenser control switch thereby deactivating said switch and terminating said feed dispensing when said timer circuit dispatches a signal, and having a pneumatic timer circuit output signal conduit, and a prep ready interlock circuit having an AND gate with one input channel interconnected with the output conduit of said prep stall call receiving sub-circuit and the other input channel interconnected with said output conduit of said udder wash timer circuit and having the output channel of said AND gate interconnected with said first input channel of said OR gate in said exit gate open sub-circuit, whereby no signal from said prep stall call receiving sub-circuit is delivered to said OR gate until said timer circuit of said udder wash produces an output signal.

* * * * *